June 14, 1966  N. V. SCHIMIZZI  3,255,808
SCHOOL MAP HOLDER
Filed Aug. 28, 1963
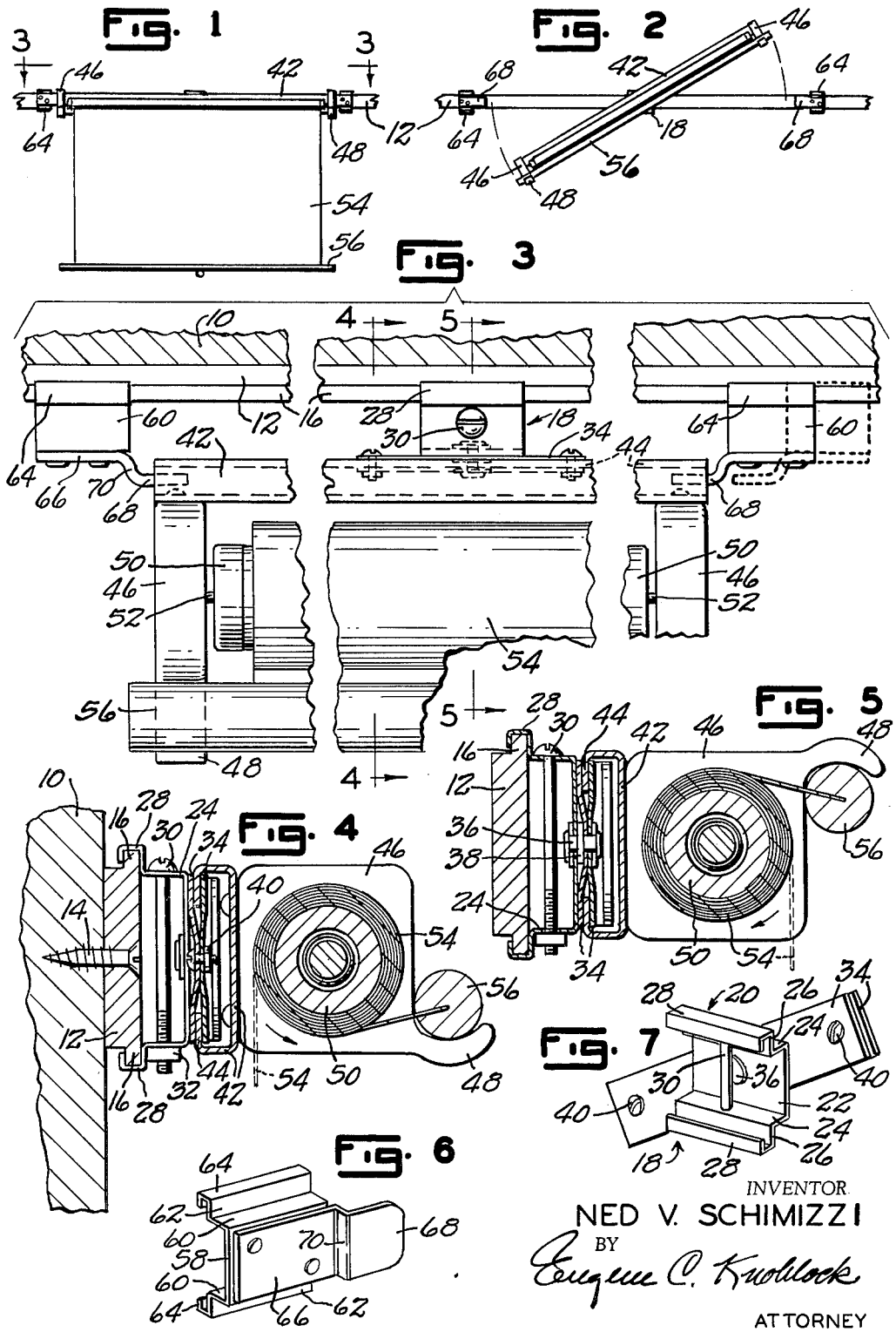
INVENTOR
NED V. SCHIMIZZI
BY
Eugene C. Knoblock
ATTORNEY United States Patent Office
3,255,808
Patented June 14, 1966

3,255,808
SCHOOL MAP HOLDER
Ned V. Schimizzi, 507 E. Broadway, Mishawaka, Ind.
Filed Aug. 28, 1963, Ser. No. 305,144
3 Claims. (Cl. 160—245)

This invention relates to improvements in school map holders.

Many types of teaching aids are now commonly used in the schoolroom. One common type of such aid is a large map or chart which can be mounted upon the wall of a room and is large enough to be viewed by all of the pupils in the room. It is common to utilize a number of such maps in a single room, and it is common to provide such maps mounted permanently upon the wall and wound around a roller when the same is not in use. Other types of visual aids used commonly in a schoolroom are motion pictures and still pictures projected by a light against a background on a schoolroom wall. The use of such projected images requires the use of screen mounted upon the wall having the proper color and character to provide a background against which light may be projected and upon which projected images appear in sharp outline. The use of motion pictures and slides in a schoolroom is usually not repeated daily, and it is uncommon to have a suitable screen provided in each room. Thus it is necessary for the teacher or an assistant to set up not only the projector but also the screen each time that motion pictures or still pictures are to be projected for classroom instruction.

It is the primary object of this invention to provide an arrangement whereby a large map or chart may have one surface thereof capable of serving as a screen for projecting a motion picture or light images thereon and having an opposed face carrying indicia such as a map or a chart used for instruction, so that the teacher may use the same article for a dual purpose by proper positioning thereof.

A further object is to provide a device of this character wherein a sheet is mounted upon a spring-wound roll and is adapted to be reversed by a simple manipulation to expose to view a desired surface of the sheet when unwound from its roller.

A further object is to provide a device of this character which is simple in construction, easy to manipulate, inexpensive, which is inconspicuous when not in use and which is rugged and stable in use to withstand long and repeated usage in schoolrooms.

Other objects will be apparent from the following specification.

In the drawing:

FIG. 1 is a front elevational view illustrating the map in its extended or use position;

FIG. 2 is a front elevational view illustrating the map in the process of reversal thereof;

FIG. 3 is an enlarged fragmentary top plan view of the device as viewed from the top in FIG. 4;

FIG. 4 is a vertical transverse sectional view taken on line 4—4 of FIG. 3;

FIG. 5 is a transverse sectional view taken on line 5—5 of FIG. 3, but illustrating the map in the reversed position from that shown in FIGS. 3 and 4;

FIG. 6 is a detail perspective view of a retaining bracket employed in the device;

FIG. 7 is a rear perspective view of the central pivot portion of the device.

Referring to the drawing which illustrates the preferred embodiment of the invention, the numeral 10 designates a wall, such as the wall of a schoolroom. An elongated molding 12 is secured to the wall 10 as by securing screws 14. In a schoolroom the molding 12 will normally extend along the top of a blackboard and at such elevation as to be within arms reach of a teacher and yet high enough to leave clear a wall space or blackboard space therebelow. The molding 12 is preferably of configured shape in cross-section, and I prefer to employ a molding of generally T-shape in cross-section characterized by upper and lower marginal longitudinal flanges 16 spaced outwardly from the wall 10.

A pivot bracket unit 18, which may be of the construction illustrated in FIGS. 4, 5 and 7, is mounted upon molding 12. The bracket 18 preferably includes a support part 20 which may be formed of sheet metal and which is characterized by a flat central portion 22 of a width less than the width of the molding 12. A pair of substantially parallel flanges 24 project from the upper and lower margins of the central flat part 22. Outturned substantially coplanar parts 26 are carried by the flange parts 24 and are adapted to abut against the upper and lower margins of the outer face of the molding 12. Hook parts 28 are carried by each of the coplanar parts 26 and each fits around one of the molding flanges 16. One or more bolts 30 extend through apertures in the flange parts 24 and a nut 32 is threaded on the bolt so that the upper and lower parts of the support 20 may be drawn together to effect a firm hooked connection of the molding flanges 16 by the hook parts 28. The pivot bracket is completed by a pair of clamp plates 34 of greater length than the support 20, which are pivotally connected at 36 to the central portion of the flat central plate or part 22 of the support 20 and may be spaced therefrom by a washer 38. The opposite projecting ends of the clamp plates 34 are preferably interconnected by securing means 40, such as bolts and nuts which are adapted to apply clamping pressure to a supported article.

An elongated map or chart carrier is supported at its center by the pivot bracket 18. In the form shown, this map or chart carrier comprises an elongated rigid channel member 42 having coplanar marginal inturned flanges 44 whose central portions are adapted to be clamped between the clamp plates 34 of the pivot bracket 18 and held tightly in clamped position by tightening of the securing members 40. End members 46 project forwardly from the opposite ends of the channel member 42 and may include projecting hook portions 48. A roller 50, preferably of the spring-wound type having detent and pawl means (not shown) for releasably locking it in any selected rotative position, is journaled to the end members 46 by pivot pins 52. A flexible map or chart 54 is wound upon the roller 50, being anchored thereto at one end and mounting an elongated rod 56 at its free end to provide a hand pull. Hand pull rod 56 is preferably longer than the map or chart and projects therefrom at both sides so as to engage the hooks 48, as illustrated in FIGS. 3, 4 and 5. The map or chart 54 will preferably have indicia upon one surface thereof and will have its opposite surface plain and of such character, color and texture as to render said opposite surface suitable for the projection of motion pictures or still pictures thereon by suitable light-projecting means, as well understood in the art.

The molding 12 will preferably mount one or more retaining and positioning means, such as that illustrated in FIG. 6. As shown in FIG. 6, the retainer means is preferably formed of sheet metal having a central plate part 58 from which extends a pair of flanges 60 in substantially parallel relation and, in turn, have outwardly projecting therefrom outturned molding abutting flanges 62 which terminate in hook parts 64 adapted to slidably embrace the upper and lower flanges 16 of the molding 12. The central part 58 of the retainer carries one end part 66 of a rigid tongue member whose opposite end portion 68 projects beyond the end of the retainer slide unit 58–64 and may be outwardly offset therefrom at 70.

The map or chart carrier 42, 46 is fixedly secured at its center by the clamp plates 34 of the pivot bracket 18 so that said map carrier may rotate in a vertical plane about the axis 36 of the pivot bracket, as well illustrated in FIG. 2. When the map carrier is positioned in proper or desired orientation parallel to the molding 12, it can be anchored firmly in that position by sliding one or a pair of retainers from the retracted position, as illustrated in dotted lines in FIG. 3, to an operative retaining position as illustrated in full lines in FIG. 3. In the operative retaining position, the projecting part 68 of the tongue of each retainer slides into the channel 42 of the frame of the map carrier with slight clearance to assume a position as illustrated in FIGS. 3, 4 and 5, which prevents rotation of the map holder or carrier. Thereupon, assuming that the map or chart 54 has been wound upon its roller 50 and is to be used, it can be unwound by pulling upon the hand pull 56 against the action of its spring until the desired extended position thereof is reached, whereupon a pawl and detent latch means thereof (not shown) become operative to hold the roller in the selected position.

The face of the map or sheet 54 which is exposed when the same is unwound depends upon the rotative position which the carrier for its roller assumes. One such rotative position is illustrated in FIG. 4 and the opposite rotative position is illustrated in FIG. 5. It will be apparent that, in the FIG. 4 position, a pull upon the map or sheet 54 will entail rotation of the roller in a counter-clockwise direction from its fully wound position and the sheet 54 will depend from the roller at a position between the roller 50 and the channel 42. When the map carrier has been swung through 180 degrees from the position shown in FIG. 4 to the position shown in FIG. 5, unwinding of the map 54 from the roller 50 will involve clockwise rotation of the roller and will cause the map to be projected from the roller at a vertical tangent thereto at the exposed or outermost part of the roller, as illustrated in FIG. 5, in dotted lines. Inasmuch as only one face of the map or chart has indicia, and the other provides a surface against which light may be projected, it will be apparent that, in one of the positions shown in FIGS. 4 and 5, the map or chart face of the sheet 54 will be exposed when extended, while in the other position the plain surface adapted to serve as a movie screen will be exposed when the sheet is projected. The sheet may be unwound and rewound with equal facility in both of the FIG. 4 and FIG. 5 positions inasmuch as the spring roller functions similarly in each of the two orientations illustrated in those figures.

While the preferred embodiment of the invention has been illustrated, it will be understood that changes in the construction may be made within the scope of the appended claims without departing from the spirit of the invention.

I claim:
1. In combination,
a wall-mounted horizontal molding member,
an elongated carrier member,
means carried by said molding member for rotatably mounting said carrier about a horizontal axis transverse thereof,
a spring rewinding roller journaled on said carrier member,
a flexible sheet wound on said roller and having two selectively usable faces, and
means shiftable on said molding for releasably locking said carrier in selected rotative position.

2. In combination,
a wall-mounted horizontal molding member,
an elongated carrier member,
means carried by said molding member for rotatively mounting said carrier about a horizontal axis transverse thereof,
a spring rewinding roller journaled on said carrier member,
a flexible sheet wound on said roller and having two selectively usable faces, and
means shiftable on said molding for releasably locking said carrier in selected rotative position,
said carrier having a socket open at its end to releasably receive said last named means.

3. In combination,
a rigid elongated carrier member,
a spring rewinding roller journaled on said carrier member,
means for mounting said carrier member at its central portion for rotation on a support about an axis transverse of its length,
means for releasably positioning said carrier member in selected rotative orientation on said support, and
a flexible sheet wound on said roller and having an indicia-bearing face and an opposite face adapted to serve as a movie screen,
said sheet exposing one of its said faces when unwound as determined by the rotative position of said carrier member relative to said support,
said mounting means constituting a pivot bracket having spaced clamp members,
said carrier having spaced parts gripped by said clamp members.

References Cited by the Examiner
UNITED STATES PATENTS

| | | | |
|---|---|---|---|
| 675,297 | 5/1901 | Pryon | 248—269 |
| 3,022,816 | 2/1962 | Petrick et al. | 160—24 |

HARRISON R. MOSELEY, *Primary Examiner.*

P. M. CAUN, *Assistant Examiner.*